Jan. 11, 1966     K. F. SINCLAIR     3,229,091
SCINTILLATION SELECTOR FOR LOW ENERGY CHARGED PARTICLES
Filed May 21, 1963
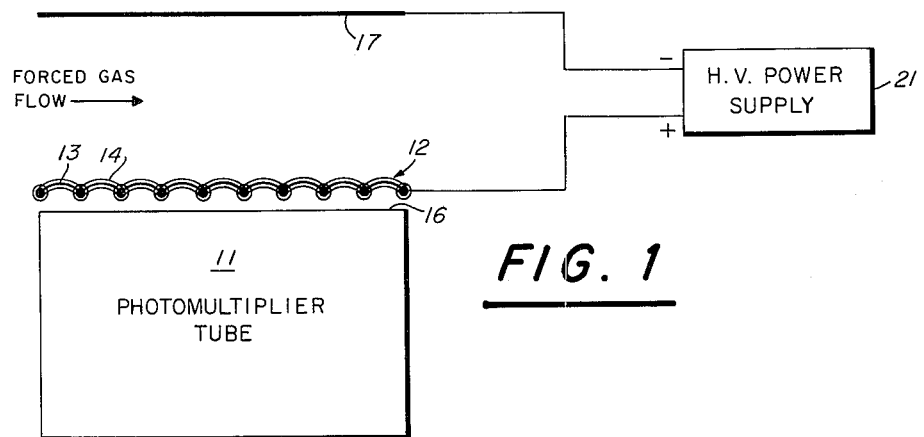
FIG. 1
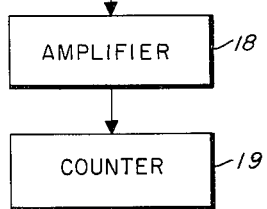
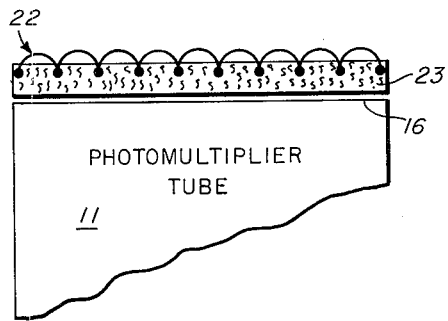
FIG. 2
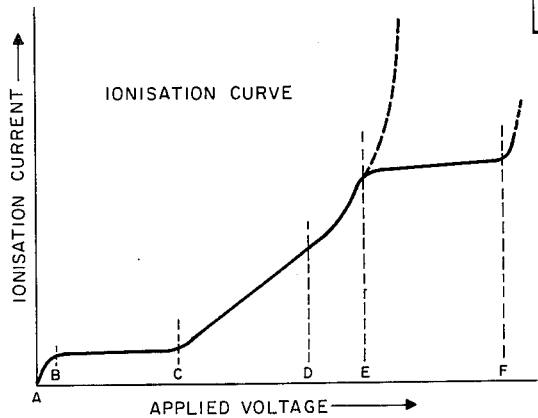
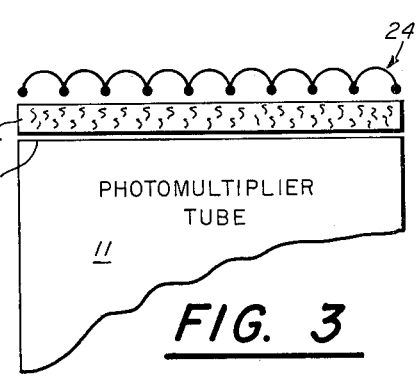
FIG. 3
FIG. 4
INVENTOR.
KENNETH F. SINCLAIR
BY
ATTORNEYS United States Patent Office 3,229,091
Patented Jan. 11, 1966

3,229,091
SCINTILLATION SELECTOR FOR LOW ENERGY
CHARGED PARTICLES
Kenneth F. Sinclair, Daly City, Calif., assignor to the
United States of America as represented by the Secretary of the Navy
Filed May 21, 1963, Ser. No. 282,185
9 Claims. (Cl. 250—71.5)
(Granted under Title 35, U.S. Code (1952), sec. 266)

The invention described herein may be manufactured and used by or for the Government of the United States of America for governmental purposes without the payment of any royalties thereon or therefor.

The present invention relates to a detector for detecting and counting low-energy, charged subatomic particles such as beta particles and more particularly to such a detector which employs both "ion" collection and "scintillation" action in cooperative combination with each other.

Prior-art devices aimed at accomplishing the detection and counting of low-energy, charged subatomic particles such as beta particles fall within two distinct general categories. The first category of such devices comprises detectors whose detection action is based upon "ion" collection and includes such detectors as flow-through "ionization chambers" and "proportional counters." When such charged subatomic particles as beta particles, and the like, pass through matter (such as a gas, for example) the electric charges carried by said particles produce mechanical forces sufficient to disrupt the electronic configurations of the atoms through which they pass. A trail of charged atoms or "ions" is accordingly left in the wake of each of said subatomic particles. These "particle-produced" ions, whose number in a given particle wake serves as an indication of the energy of the originating subatomic particle, are then collected and counted to indicate the number of originating subatomic particles involved. The second category of such devices is based, not upon the collection and counting of ions created by the charged subatomic particles, but upon immediate detection of the charged subatomic particles themselves. "Scintillation counters" are the most important of these detectors which do not relay upon "ion collection." In the "scintillation counter" a phosphor scintillator, serving as a target against which the subatomic particles in question impinge, converts the kinetic energy of the motion of each impinging subatomic particle into an equivalent light pulse which, in turn, is picked up by a photomultiplier tube which converts each light pulse detected from the scintillator into a corresponding electrical pulse, these electrical pulses then being counted to indicate the number of subatomic particles which initiated this chain of conversion events.

Both of the aforementioned categories of prior art devices for the detection of low-energy charged subatomic particles such as beta particles have serious drawbacks. Detectors of the first category, such as the flow-through type ionization chamber and the proportional counter, tend to be quite humidity-sensitive, i.e., shifts in humidity materially alter the accuracy of their indication. Detectors of the second category, on the other hand, such as the scintillation counter, require delicate, sophisticated and sensitive counting equipment. For example, the scintillation method as employed by the scintillation counter requires the use of expensive phototubes, low noise amplifiers, pulse height discrimination techniques, and temperature control on the phototubes to minimize noise problems. Moreover, the delicateness of the scintillation counter system cannot tolerate the inevitable contamination to the operative sensing surfaces of the counter, with the result that the scintillant medium must be continually cleaned and replaced.

Summarized briefly, the present invention in essence couples a "proportional multiplier" with a "scintillation counting device" in appropriate combination to detect and count low-energy charged subatomic particles, such as beta particles. The "proportional multiplier" portion of the combination imposes across the radioactive gas, which is being examined for the presence therein of the low-energy charged particles, an electric field which acts to accelerate the "primary ions" produced by the interaction of the (original) beta particles with atoms/molecules of the radioactive gas so that these primary ions "collide" with still other atoms/molecules of the radioactive gas to produce "secondary ions" which, in turn, are accelerated and produce further secondary ion multiplication. The process of ionization effected by the "proportional multiplier" is a "cumulative" one, with each low-charged subatomic particle producing a large number of resultant ions. This "gas multiplication" achieved through the cumulative ionization is essentially constant, i.e., the "proportional multiplier" design characteristics are such that for each subatomic charged particle event the "secondary ions" produced are proportional to the "primary ions" associated with such subatomic particle event, so that, if the resulting ions are collected and registered, they will serve as an indication of the number of low-energy charged particles which initiated the cumulative ionization. In addition to producing a very large number of ions (through this process of "cumulative ionization") for each original low-energy charged particle in the gas within the operative confines of the "proportional multiplier," this proportional multiplier causes the negative ions present in the resulting ion group (derived from the cumulative ionization) to be collected at the scintillant of a scintillant-photomultiplier unit. These negative ions connected at the scintillant give rise to the emission of light pulses many times larger in amplitude than would be produced at the scintillant by the collection thereat merely of the original low energy charged subatomic particles themselves. These enhanced-amplitude light pulses are then observed by the photomultiplier and converted to electrical impulses which are passed to a conventional counting system for counting, the count registered reflecting the number of low energy subatomic particles present in the sensitive volume embraced by the "proportional multiplier." The scintillant-photomultiplier unit along with the conventional pulse counting system connected thereto make up what has been referred to above as the "scintillation-counting device" of the invention combination.

The advantages of the present invention over the prior art, described above, are manyfold. For instance, as opposed to the "first" category of prior-art devices such as the so-called flow-through "ionization chambers" and the "proportional counters," the present detector is not subject to any significant aberration because of humidity sensitivity. And compared with the "second" category of prior-art devices such as the "scintillation counter," because of the enhanced-amplitude light pulses obtained at the scintillant herein by way of the "gas multiplication" effect, as opposed to the relatively-feeble light pulses produced at the scintillant in the prior-art "scintillation counter," the scintillation technique employed herein does not require the expensive phototubes, low noise amplifiers, the use of pulse height discrimination techniques, and temperature control on the phototube(s) (to minimize noise problems) which characterize the prior-art scintillation counter. Also, because of these "enhanced-amplitude" light pulses, this detector is not bothered by contamination to the extent that the prior-art scintillation counter is. Accordingly, the present invention yields a detector for detecting low-energy charged subatomic particles which achieves greater sensitivity with much less electronic sophistication than its predecessors and which is characterized by enhanced reliability and dependability along with freedom from humidity sensitivity. Its ruggedness provides it with a high degree of "environmental immunity," making it employable in an actual out-of-door environment, rather than merely as a laboratory-type device.

Among objects of importance of the present invention are the following:

To provide a rugged detector for detecting and counting low-energy charged subatomic particles;

To provide a rugged detector, for detecting and counting low-energy charged subatomic particle, which possesses a high degree of environmental immunity;

To provide a detector for detecting and counting low-energy charged subatomic particles, such as beta particles, which is substantially free of humidity sensitivity.

To provide a detector for detecting and counting low-energy charged subatomic particles which employs the scintillation technique, but without the need for expensive phototubes, low noise amplifiers, pulse height discrimination techniques and temperature control on the phototube(s) (employed to minimize noise problems).

To provide a detector for detecting and counting low-energy charged subatomic particles, such as beta particles, which employs a simple, non-critical "air" proportional type device to greatly relieve the problems involved in low-energy particle counting;

To provide a detector for detecting and counting low-energy charged subatomic particles which incurs the advantages of both detectors which are based on ion collection and detectors which are based upon collection of the original charged subatomic particles and which largely avoids the disadvantages incident to both of such prior-art detector types.

Other objects and many of the attendant advantages of this invention will be readily appreciated as the same becomes better understood by reference to the following detailed description when considered in conjunction with the accompanying drawing in which:

FIG. 1 is a schematic showing of a preferred embodiment of the invention;

FIG. 2 portrays a first modification of the grid-scintillant-photomultiplier portion of the invention;

FIG. 3 portrays a second modification of the grid-scintillant-photomultipler portion of the invention; and FIG. 4 portrays a typical ionization curve for a general radiation detector.

In the detailed discussion which follows, for the sake of brevity of terminology, the low-energy charged subatomic particle towards which this invention is directed will be referred to as a "beta particle" which is illustrative of the type of subatomic particle involved.

Referring now explicitly to FIG. 1 of the drawing, there is seen a standard photomultipler tube 11 and a grid 12 formed of very fine wires 13 covered with a thin coating of a suitable conventional scintillant material 14. This scintillant-coated grid 12, which is substantially planar in its extent, is positioned over and in close proximity to the photocathode surface 16 of the photomultipler tube 11. Parallel to the plane of fine-wire, scintillant-coated grid 12 and at some appropriate distance therefrom there is located a planar metal conducting plate 17. The output of standard photomultiplier tube 11 is connected by way of a conventional electrical pulse amplifier 18 to a conventional electrical pulse counter 19. A conventional high voltage power supply 21 whose output value will be discussed infra is connected across metal conducting plate 17 and grid 12, with conducting plate 17 connected to the negative pole of the power supply 21 and fine-wire, scintillant-coated grid 12 connected to the positive pole of power supply 21.

FIG. 1 shows the preferred form of the grid and scintillant combination as linked with photomultipler tube 11. However, alternate methods of construction are possible for this combination. FIG. 2, for instance, shows a modification for this grid-scintillant-photomultiplier combination wherein the fine-wire grid 22 is uncoated (i.e., not coated with scintillant material) and is embedded in the surface of the scintillant plaque 23 which is positioned (as shown) in close proximity to the photomultiplier tube 11. FIG. 3 shows still another modification wherein the fine-wire grid 24 is uncoated and is suspended over, but very close to, the scintillant plaque 26.

FIG. 4 portrays a typical ionization characteristic as reflected by a typical radiation particle detector containing an ionizable gas and shows the relationship of the type of ionization process going on within the detector "sensitive volume" to the magnitude of the potential applied to the detector electrodes. At very low voltages the detector will function as an "ionization chamber." With further increase in voltage the detector will behave as a "proportional counter" and with still greater increase in voltage it acts as a "Geiger counter." As increasing potential is applied to the detector system it will be noted that ionization current increases until at point B it reaches a "plateau." Between points B and C the detector chamber is considered to be operated at "saturation" for during the potential interval B–C increases in applied voltage will not affect the ionization current. At voltage point C it will be noted that, with further increase in applied voltage, ionization current takes a sharp rise. This is due to the onset at point C of "secondary" ionization which yields a cumulative ionization effect as the potential is increased past point C. Point C is referred to in this art as the "threshold of proportionality." It is between the substantially linear portion of the curve defined by points C and D that the detector of tne present invention is operated. That is, the voltage gradient imposed across grid 12 and metal conducting plate 17, which are the operative electrodes of the "proportional multiplier" portion of the present detector, is somewhere in this "proportional" range C–D. (By way of parenthetical mention, continuing up the ionization characteristic curve, point D is known as the threshold of the region of "limited proportionality" and point E as the "Geiger threshold" which initiates the region of potential in which the so-called Geiger counters are operated.)

The radioactive gas which is to be examined for the presence therein of beta particles is caused to flow by such conventional means as a blower or the like (not shown) through the space between the conducting plate 17 and the scintillant-coated fine-wire grid 12. Conducting plate 17 and grid 12, which are parallel to each other, are substantially coextensive, with conducting plate 17 generally being slightly larger in compass than the grid 12. These members, conducting plate 17 and grid 12, substantially define therebetween the "sensitive volume" of the detector and it is the gas volume encompassed by this "sensitive volume" at any given time which is under examination by the detector. With the voltage impressed between conducting plate 17 and grid 12 at a level which falls within the "proportional region" (C–D of FIG. 4) as defined supra, the following events take place within the "sensitive volume" of the detector. Beta particles present in the gas within the sensitive volume will ionize some of the molecules of the gas into positive and negative ions. With grid 12 connected to the positive pole of high voltage power supply 21 and conducting plate 17 connected to the negative pole of power supply 21, the electric field established between conducting plate 17 and grid 12 causes the negative ions to be directed toward grid 12 and the positive ions to be directed toward conducting plate 17. The voltage applied across this system is sufficiently large so that the negative ions, on arriving in the vicinity of the high field region surrounding fine-wire grid 12, achieve enough energy to ionize other molecules/atoms of the gas. The resulting ions in turn are accelerated until they ionize still other gas molecules/atoms. The process of ionization just described is sometimes referred to as "cumulative ionization." A beta particle, present in the gas in the detector "sensitive volume," by "collisions" with gas molecules/atoms initiates the original "ionizing events" with the resulting "primary ions" therefrom under accelerating influence of the electric field then causing other "collisions" which produce "secondary ions." These "secondary ions" under the accelerating influence of the electric field produces still other ionizing events in the gas and so on. The chain of these ionizing events produces a process of cumulative ionization. The result of this process of cumulative ionization is that each original beta particle produces an avalanche or cascade of negative ions which will be precipitated toward grid 12 by the electric field between grid 12 and conducting plate 17. This "multiplicative effect" is why the apparatus, whose operation has just been described, is referred to as a "proportional multiplier."

Precipitated by the electric field (formed between grid 12 and conducting plate 17) the negative ions made up of the original beta particle and the large number of negative ions created thereby are caused to impinge upon the scintillant material 14 which coats the fine wire 13 of grid 12. This scintillant material 14 represents any conventional phosphor (luminophor) which is a material which emits light when a charged particle passes into its structure. The negative ions collected at the scintillant-coated grid 12, because of the "cumulative ionization" and "avalanche" effects described above, will give rise to the emission from the scintillant material 14 of an "aggregative" light pulse for each initial beta ionizing event, but, because each opertive beta event is now represented at the scintillant "target" by an "avalanche" of negative ions rather than by a single beta particle, each light pulse produced at the scintillant material 14 will be many times larger in amplitude than the light pulse which would have been anticipated on the basis of the original beta particle by itself. Each negative ion incident upon scintillant material 14 produces an individual scintillation in this scintillant material 14. However, because the various individual ions which make up an "avavlanche" of negative ions derived from a single beta particle event strike the scintillant material at substantially the same time for the purpose at hand (i.e., the time interval between the respective impacts on the scintillant material of the first and last-arriving ions of a single-beta-derived "avalanche" is very short compared to the resolving time of the system), the multiple scintillations produced by such an "avalanche" in effect combinedly produce a single "aggregative" light pulse. With scintillant-coated grid 12 located in close proximity to the photocathode surface 16 of standard photomultiplier tube 11 to provide optimum optical coupling between scintillant-coated grid 12 and photomultiplier tube 11, the light pulses produced at the scintillant material 14 of grid 12 will be sensed by photomultiplier tube 11 and converted to equivalent electrical impulses which are passed from the output of photomultiplier 11 to a conventional counter 19 by way of a conventional signal amplifier 18. Amplifier 18 is present in the preferred embodiment to sharpen up the response of the system. It may be omitted as an element in the system if come other portion of the overall system is capable of performing an equivalent amplifying function. For example, the amplification provided by amplifier 18 could be afforded by the particular design of photomultiplier tube 11.

Because of the enhanced amplitude of the "aggregative" light pulses originating from scintillant coated grid 12, the scintillation counting portion of this detector employs a standard photomultiplier tube, a conventional amplifier and a conventional counter. It can use such standardized items (instead of specially-adapted like elements) only because of the "gas-multiplication" effect achieved in the "proportional multiplier" portion of the detector.

FIGS. 2 and 3 show alternative structure for the grid-scintillant combination. The modifications employing these alternative constructions operate essentially as described above for the FIG. 1 embodiment. Whether the fine-wire grid (now uncoated) is embedded in the scintillant plaque or suspended thereover, the perforate structure of the grid will allow sufficient beta-representative negative ions, resulting from the cumulative ionization in the proportional multiplier, under the accelerating influence of the electric field between grid and plate, to precipitate upon the scintillant plaque for originating the pertinent light pulses therein.

Obviously many modifications and variations of the present invention are possible in the light of the above teaching. It is intended to cover all changes and modifications of the embodiments set forth herein which do not constitute departures from the spirit and scope of the invention.

What is claimed is:

1. A detector, for detecting low-energy charged subatomic particles which may be present in a gaseous medium, which comprises, in combination;

an electrically-conductive substantially-planar plate;
an electrically-conductive grid substantially co-extensive with said plate, said grid being composed of fine wires and being positioned to be substantially parallel to and spaced from said plate;
said plate and said grid permitting substantially free-flowing passage therebetween of said gaseous medium and substantially defining therebetween by their respective boundary limits the sensitive volume of said detector;
high-voltage power supply means, with its negative pole connected to said plate and its positive pole connected to said grid for establishing, between said plate and said grid, an electric field of a strength to cause within the body of gas contained in the sensitive volume of said detector a process of cumulative ionization of molecules of said body of gas when charged subatomic particles are present in said body of gas, each of the low-energy charged subatomic particles when present in said body of gas interacting with molecules of said body of gas to produce ions which in turn are accelerated by said electric field to produce still more ions in said body of gas in a continuing process which is cumulative in nature and which causes each of said low-energy charged subatomic particles to give rise to a given group of ions whose number is very many times that of the originating subatomic particle;
said electric field as applied between said plate and said grid, further serving to direct the negative ions of each of the given groups of subatomic-particle-derived ions toward said grid;
luminophor means, located in covering position around the fine wires of said electrically conductive grid, for emitting scintillations in response to ions incident upon said luminophor means;
transducer-amplifier means, located closely adjacent said fine-wire grid, for sensing the scintillations produced by said luminophor means in response to ion incidence thereupon and for converting the aggregation of scintillations by the negative ions of a given group of subatomic-particle-derived ions into an amplified electrical pulse;
counting means, connected to the output of said transducer-amplifier means, for registering the count rate for the scintillation-derived electrical pulses coming from said transducer-amplifier means, said count rate serving as an indication of the number of low-energy charged subatomic particles present in the body of gas located within the sensitive volume of said detector.

2. The detector of claim 1 wherein the level of potential difference established between said plate and said grid by said high voltage power supply means is in the proportional region of the ionization characteristic applicable to said detector.

3. A detector, adapted to detect and count low-energy charged subatomic particles present in that portion of a gas which is found within the sensitive volume of said detector, which comprises in combination:

proportional multiplier means both for causing each of the low-energy charged subatomic particles present within the body of gas contained in the sensitive volume of said detector to produce, by cumulative ionization of molecules of said body of gas as initiated by the low-energy charged subatomic particle concerned, a group of many negative ions and for causing the resulting groups of negative ions derived from said low-energy charged subatomic particles to be generally directed in a single given direction;

luminophor means, interposed in the directional path of said negative ions, for producing an operative light pulse in response to each subatomic-particle-derived group of negative ions incident upon said luminophor means, the light pulse produced at said luminophor means in response to the impact thereupon by each group of negative ions being considerably greater in amplitude then would have been produced at said luminophor means by the impact thereupon of the original low-energy charged subatomic particle which initiated the given group of negative ions;

transducer-amplifier means, located closely adjacent said luminophor means, for sensing the light pulses emitted by said luminophor means and for converting each of said light pulses into an amplified electrical pulse;

counting means, connected to the output of said transducer-amplifier means, for registering the count rate for the light pulse-derived electrical pulses produced by said transducer-amplifier means, said count rate serving as an indication of the number of low-energy charged subatomic particles present in the body of the gas located within the sensitive volume of said detector.

4. A detector, for detecting low-energy charged subatomic particles, on the order of beta particles, which may be present in a gaseous medium, which comprises, in a combination;

an electrically-conductive substantially-planar plate;

an electrically-conductive grid substantially coextensive with said plate, said grid being composed of fine wires and being positioned to be substantially parallel to and spaced from said plate;

said plate and said grid permitting substantially free-flowing passage therebetween of said gaseous medium and substantially defining therebetween by their respective boundary limits the sensitive volume of said detector;

high-voltage power supply means, with its negative pole conected to said plate and its positive pole connected to said grid, for establishing, between said plate and said grid, an electric field of a strength to cause within the body of gas contained in the sensitive volume of said detector a process of cumulative ionization of molecules of said body of gas when charged subatomic particles are present in said body of gas, each of the low-energy charged subatomic particles when present in said body of gas interacting with molecules of said body of gas to produce ions which in turn are accelerated by said electric field to produce still more ions in said body of gas in a continuing process which is cumulative in nature and which causes each of said low-energy charged subatomic particles to give rise to a given group of ions whose number is very many times that of the originating subatomic particle;

said electric field, as applied between said plate and said grid, further serving to direct the negative ions of each of the given groups of subatomic-particle-derived ions toward said grid;

luminophor means, located closely adjacent said grid and on the opposite side of said grid from said plate, for emitting scintillations in response to ions incident upon said luminophor means;

transducer-amplifier means, located closely adjacent said fine-wire grid, for sensing the scintillations produced by said luminophor means in response to ion incidence thereupon and for converting the aggregation of scintillations by the negative ions of a given group of subatomic-particle-derived ions into an amplified electrical pulse;

counting means, connected to the output of said transducer-amplifier means, for registering the count rate for the scintillation-derived electrical pulses coming from said transducer-amplifier means, said count rate serving as an indication of the number of low-energy charged subatomic particles present in the body of gas located within the sensitive volume of said detector.

5. The detector of claim 4 wherein the level of voltage applied between said plate and said grid by said high voltage power supply means is in the proportional region of the ionization characteristic applicable to said detector.

6. A detector, for detecting low-energy charged subatomic particles which may be present in a gaseous medium, which comprises in combination;

an electrically-conductive substantially-planar plate;

a luminophor plaque positioned to be substantially parallel to and spaced from said plate and adapted to emit scintilltions in response to ions incident upon said plaque;

an electrically-conductive grid substantially coextensive with said plate, said grid being formed of fine wires and being partially imbedded in that surface of said luminophor plague which faces said plate;

said plate and said grid permitting substantially free-flowing passage therebetween of said gaseous medium and substantially defining therebetween by their respective boundary limits the sensitive volume of said detector;

high-voltage power supply means, with its negative pole connected to said plate and its positive pole connected to said grid, for establishing, between said plate and said grid, an electric field of a strength to cause the primary ions resulting from the interaction of each low-energy charged subatomic particle present in said body of gas with molecules of said body of gas to be sufficiently accelerated to produce secondary ions in said body of gas in a continuing process which is cumulative in character and which causes each of said low-energy charged subatomic particles to give rise to a given group, large in number, of resultant ions;

said electric field, as applied between said plate and said grid, further serving to direct the negative ions of each of the given groups of subatomic-particle-derived ions toward said grid;

transducer-amplifier means, located closely adjacent said luminophor plaque in optical coupling therewith for sensing the scintillations produced by said luminophor plaque in response to ion incidence thereupon and for converting each light pulse formed by the aggregation of scintillations produced by the negative ions of each given group of subatomic-particle-derived ions into an amplified electrical pulse;

counting means, connected to the output of said transducer-amplifier means, for registering the count rate for the scintillation-derived electrical pulses coming from said transducer-amplifier means, said count rate serving as an indication of the number of low-energy charged subatomic particles present in the body of gas located within the sensitive volume of said detector.

7. The detector of claim 3 wherein said transducer-amplifier means comprises a photomultiplier means.

8. The detector of claim 6 wherein the level of voltage applied between said plate and said grid by said high voltage power supply means is in the proportional region of the ionization characteristic applicable to said detector.

9. A detector, for detecting low-energy charged subatomic particles which may be present in a gaseous medium, which comprises in combination:

an electrically conductive first electrode;

an electrically conductive perforate-structure second electrode substantially coextensive with said first electrode and positioned to be substantially parallel to and spaced from said first electrode;

said first and said second electrodes permitting substantially free-flowing passage therebetween of said gaseous medium and substantially defining therebetween by their respective boundary limits the sensitive volume of said detector;

high voltage power supply means, with its negative pole connected to said first electrode and its positive pole connected to said second elcetrode, for establishing, between said first and second electrodes, an electric field of a strength to cause the primary ions resulting from the interaction of each low-energy charged subatomic particle present in said body of gas with molecules of said body of gas to be sufficiently accelerated to produce secondary ions in said body of gas in a continuing process which is cumulative in character and which causes each of said low-energy charged subatomic particles to give rise to a given group, large in number, of resultant ions;

said electric field, as applied between said first and said second electrodes, further serving to direct the negative ions of each of the given groups of subatomic-particle-derived ions toward said perforate-structure second electrode;

luminophor means, located in covering position around the perforate structure of said second electrode, for emitting scintillations in response to ions incident upon said luminophor means;

transducer-amplifier means, located closely adacjent said luminophor means, for sensing the scintillations produced by said luminophor means in response to ion incidence thereupon and for converting each light pulse formed by the aggregation of scintillations produced by the negative ions of a given group of subatomic-particle-derived ions into an amplified electrical pulse;

counting means, connected to the output of said transducer-amplifier means, for registering the count rate for the light-pulse-derived electrical pulses coming from said transducer-amplifier means, said count rate serving as an indication of the number of low-energy charged subatomic particles present in the body of gas located within the sensitive volume of said detector.

References Cited by the Examiner
UNITED STATES PATENTS

| | | | |
|---|---|---|---|
| 2,768,307 | 10/1956 | Tirico | 250—71.5 |
| 2,944,146 | 7/1960 | Schultz | 250—71.5 |
| 3,089,032 | 5/1963 | Goupil | 250—83.6 |

RALPH G. NILSON, *Primary Examiner.*

J. W. LAWRENCE, *Assistant Examiner.*